Sept. 4, 1951            H. C. OTIS            2,566,774

SAFETY CONTROL VALVE

Filed Feb. 4, 1947

Herbert C. Otis
INVENTOR.

BY
ATTORNEYS

Patented Sept. 4, 1951

2,566,774

UNITED STATES PATENT OFFICE 2,566,774

SAFETY CONTROL VALVE

Herbert C. Otis, Dallas, Tex.

Application February 4, 1947, Serial No. 726,372

3 Claims. (Cl. 137—153)

This invention relates to improvements in valves and refers more particularly to valves having pressure actuated mechanism for shifting the closure member. Valves of this type have many uses such as for example as a safety device in pipe lines where the flow of high pressure gas or the like through the pipe line may be controlled in response to the pressure of a control fluid, which may be the fluid flowing through the pipe line.

Heretofore in valves of this type the closure member may be shifted automatically in response to pressure in one direction or to one position that is either open or closed. However, manually operated mechanism has been resorted to for shifting the valve closure member in the other direction or to the other position. This mechanism requires an extension of a stem through the valve bonnet and connected to the closure member. A stuffing box or other similar seal is used to prevent leakage of the fluid controlled from the valve. This increases the cost of the structure and in addition the stuffing box or other seal is subject to failure requiring frequent replacement and resulting in a loss of fluid and possible fire hazard when inflammable materials are handled. Furthermore, when leaks occur in this stuffing box, the refrigeration resulting from the expansion at the leak may cause formation of hydrates and freezing thereof around the stem, thereby interfering with the movement of the valve from open to closed position or vice versa.

An object of this invention is to provide a valve in which the closure member may be shifted to both open and closed positions by the pressure actuated mechanism.

Another object is to provide a valve in which the formation and freezing of hydrates will not interfere with the operation thereof.

Another object is to provide a valve having a pressure actuated mechanism for shifting the valve closure member in which the actuating mechanism is adapted to shift the valve closure member to one position in response to the pressure of a control fluid.

A further object is to provide a valve having a pressure actuated mechanism for shifting the valve closure member to one position in response to the pressure of a control fluid wherein the closure member may be selectively returned to its normal position by manual manipulation of auxiliary valves.

Figure 1:
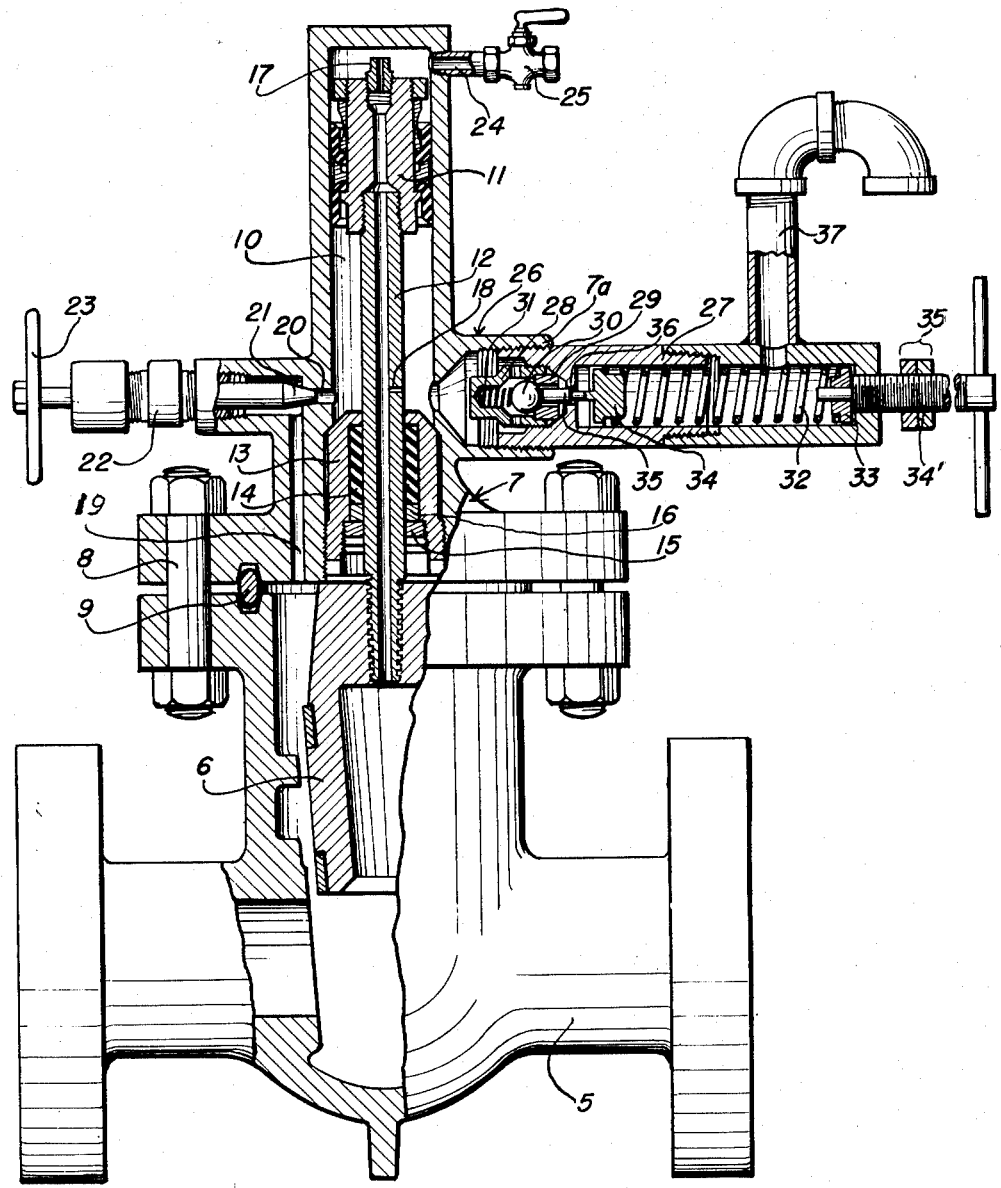
Figure 2:
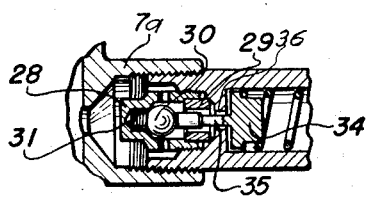

Other and further objects of this invention will appear from the following description:

In the accompanying drawings which form a part of the instant specification and are to be read in conjunction therewith and wherein like reference numerals are used to indicate like parts in the various views, Fig. 1 is a side elevational view of the valve embodying this invention with parts shown in section; and Fig. 2 is a detail of the auxiliary pressure responsive valve shown in Fig. 1 illustrating the position of the auxiliary valve member and associated parts with the auxiliary valve open.

Referring to the drawings, numeral 5 designates a valve body having a passageway therethrough and adapted to be connected in a high pressure pipe line or the like. The valve closure member 6 is illustrated as a gate and is adapted to seat across the passageway of the valve body 5 to close the valve.

The valve bonnet or cap 7 may be secured to body 5 by means of bolts 8 with a seal ring 9 between the confronting surfaces of the body and bonnet flanges in a conventional manner. The bonnet has formed therein a chamber or cylinder 10 which forms a housing for the valve actuating mechanism. The actuating mechanism comprises a two way piston 11 reciprocally mounted within the chamber 10 dividing the chamber into upper and lower pressure compartments. The piston has an operable connection with valve closure member 6 through the stem 12 threaded at opposite ends to the piston and closure member. A stuffing box housing 13 is threaded into the bore of bonnet 7 and surrounds the stem. The stuffing box is made up of the usual packing 14 and gland or nut 15 threaded to the open end of the stuffing box housing 13 and may include a spacer 16.

In order that a pressure fluid may be supplied to both compartments of chamber 10 the stem 12 has a central axial passage which communicates at one end with the interior of the valve body and at its upper end with the upper compartment of chamber 10 through the central passage of piston 11 and the choke 17 threaded in the bore of the piston. A radial port 18 in stem 12 communicates between the axial passage of the stem and the lower compartment of chamber 10 when the piston is in substantially its upper extreme position. Obviously when the piston is moved somewhat downwardly radial passage 18 is covered by the stuffing material 14 to block this communication. It is important to note that the bore of choke 17 is of greater diameter than the diameter of passage 18 whereby the rate of supplying pressure fluid to the upper compartment is greater than that to the lower compartment.

An additional pressure fluid supply connection has been provided for the lower compartment. This connection constitutes the vertical passage 19 in the bonnet which communicates with the interior of the valve body and radial port 20. The radial port 20 is controlled by a tapered valve member 21 the stem of which extends exteriorly of the bonnet through the stuffing box 22 and has a handle 23 at its end. Thus, this connection may be selectively opened or closed by manipulation of handle 23 to advance and retract the tapered valve. This pressure connection supplies pressure fluid to the lower compartment for the purpose of moving the piston 11 from a lower to an upper position. Obviously with valve 21 open, pressure within the two compartments will be substantially equal, as both compartments will be in communication with the interior of the valve body. In order to create a differential across the piston 11 a release connection 24 controlled by petcock 25 is provided for the upper compartment. The diameter of connection 24 and the passage through valve 25 is substantially greater than that of choke 17 whereby the pressure may be rapidly relieved from the upper compartment to permit movement of the piston to its upper position.

In order to actuate piston 11 to shift the valve member into the opposite or seated position a pressure release connection 26 has been provided for the lower compartment. The connection 26 is controlled by a pressure responsive valve which is adapted to open when the pressure of the control fluid reaches a predetermined limit. In the embodiment illustrated the control fluid is the fluid to be controlled as the valve is responsive to the pressure within the lower compartment.

This valve comprises a two piece housing 27 threaded into the boss 7a of the bonnet. The valve cage 28 is threaded into the left end of housing 27 and has radial ports communicating between the interior and exterior of the cage. A removable seat ring 29 is held between an internal shoulder of the valve cage and a tapered portion of the housing bore adjacent its threaded connection with cage 28. A ball valve 30 is positioned within the cage and is urged against the upstream side of the seat by a weak spring 31.

A spring pressed or resilient element is provided to exert an unseating force against ball valve 30. This resilient element comprises the spring 32 within housing 27 having its ends pressed between blocks 33 and 34. Block 33 is carried by threaded stem 34 which has threaded engagement with one end of housing 27. Lock nuts 35 are provided on stem 34' to facilitate resetting of a predetermined compressive force on spring 32. Block 34 at the other end of the spring has contact with ball valve 30 through an extension 35 which passes through a restricted portion of the bore of housing 27. Extension 35 has a head or part of relatively large diameter which just fits within restriction 36 substantially blocking the passage. The extension has a neck portion of reduced diameter connecting the enlarged portion to the block 35. The length of the neck portion is sufficient to extend through the restriction 36 when the block 34 is at its extreme left position within housing 27 as shown in Fig. 2. Preferably the neck portion of the extension has a tapered juncture with the head portion to facilitate retraction of the extension so that the head portion resides within the restriction 36. The pressure release connection is completed by a fitting or vent 37 which communicates between the interior of housing 27 and the atmosphere. In some instances a choke may be placed in the open end of vent 37 to reduce rate of flow therethrough. In any event the vent and the release connection as a whole must permit the rate of flow from the lower compartment at a substantially greater rate than can be accommodated by radial port 18 which supplies pressure fluid to the lower compartment.

It is important with regard to the proper rate of flow of fluid through the release connection that the diameter of the neck portion of extension 35 be sufficiently small as to provide an annular space having a total area substantially greater than the area of port 18.

In operation the valve is assembled in a manner which is believed will be apparent from the foregoing description to those skilled in the art. In the embodiment illustrated the pressure responsive valve which controls the pressure release connection to the lower compartment of chamber 10 is of the type adapted to release the pressure when the control pressure (pressure within the lower compartment in the embodiment illustrated) falls below a predetermined limit. The ball valve 30 will be unseated to relieve the pressure from the lower compartment. Then the pressure of the upper compartment, which will be substantially that of the controlled fluid, will force the two way piston 11 to its lower position thus shifting the gate or closure member 6. In its seated position the gate shuts the passageway through the valve body. Thus, if the pressure within the valve body falls below a predetermined limit the valve will automatically shut. Such low pressure condition might occur for instance when a break occurs in the pipe line in which the valve is disposed.

To open the valve closure member 6 it is necessary to retract stem 34' in order to permit the weak spring 31 to seat ball valve 30. Then the valve 21 is unseated by manipulation of handle 23 to open the pressure fluid connection to the lower compartment 10. Petcock 25 is then opened and the pressure exerted against the lower cup of the two way piston urges the piston to its upper position as shown in the drawings. Petcock 25 is then closed and the pressure within the two compartments is equalized. It will be noted that the friction between the packing 14 and the stem 12 plus the friction between the piston 11 and the interior of the cylinder 10 will be ample to hold the valve in a static condition as long as the pressures thereon are equalized.

With the gate opened and petcock 25 closed valve 21 may then again be closed. The threaded stem 34' is then advanced until the lock nut 35 engages the end of housing 27 to impose a predetermined compression upon spring 32. Obviously the degree of compression may be adjusted by adjustment of lock nuts 35. The compressive force of spring 32 is then exerted through block 34 and extension 35 against the ball valve 30. The pressure of the fluid within the lower compartment exerts a force in an opposite direction against the ball valve and this force is exerted against an area equivalent to the area of the seat 29. The spring 31 preferably is so weak that the force exerted by it is negligible. However, it is contemplated that a heavier spring may be used in which event the spring must be accounted for in the setting or adjustment of the compression of spring 32.

When the pressure within the valve body, for any cause, reaches a predetermined lower limit so that leakage is permitted past the ball valve 30 the pressure in back of the seat quickly builds up to substantially the same pressure within the cage 28 as the head of extension 35 substantially fills the bore through the restriction 36. Thus, the force tending to seat valve 30 is substantially nullified. The area of the head portion of extension 35 is materially less than the area across the seat 29. For this reason the forces exerted against the extension member tending to hold the spring 32 in compression are materially reduced and extension 35 is thrust forward by the spring with a snap action to completely unseat ball valve 30 as shown in Fig. 2. In its advanced position the neck portion of extension 35 extends through the restricted bore 36 providing a large passage relative to the area of passage 18 for the venting of fluid from the lower compartment of chamber 10. With the pressure within the lower compartment reduced, piston 11 is thrust downwardly with a snap action to ripidly and positively shift gate valve 6 to a seated position. The speed with which the piston is thrust downwardly in some instances, especially where high pressures are controlled by the valve, is so great as to sometimes subject the bottom of the valve body to a great shock or strain. If this is likely, a choke may be placed in the vent 37 as heretofore described to reduce the rate at which the pressure within the lower compartment of chamber 10 is relieved. This will effectively slow up the rate of travel of piston 11 and at the same time provide a snap action for the closing of the gate 6. The gate valve 6 may be shifted to its open position in the manner heretofore described.

While the pressure responsive valve controlling the release of pressure from the lower compartment has been described and shown as one which is open when the controlled pressure reaches a predetermined lower limit this is shown only by way of illustration and not by way of limitation. It is contemplated that a valve may be used which will open when the pressure exceeds a predetermined limit. It is also contemplated that the arrangement of pressure supply and release connections for the compartments of chamber 10 may be so arranged as to shift the valve closure member 6 from closed to open position in response to the pressure of the controlled fluid in which case the closure member may be shifted from open to closed position by manual manipulation of the auxiliary valves controlling the supply and release connections as will be understood by those skilled in the art.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. In a valve, a closure member, a chamber, a pressure responsive member having an operable connection with the closure member and within the chamber dividing it into two variable capacity compartments having constant total volume, pressure fluid supply and release connections for the compartments for creating pressure differentials across the pressure responsive member to shift it to extreme position within the chamber and thereby actuate the valve closure, said supply and release connections including a pressure fluid supply connection and release connection for one compartment with a manually controlled valve for the release connection, a supply connection for the other compartment operable only with the pressure responsive member in a position to afford substantially maximum capacity for this compartment, another supply connection for this latter compartment with a valve controlling the connection and a release connection for the latter compartment, with a pressure responsive valve controlling the connection adapted to open when the pressure of a controlled fluid reaches a predetermined limit, whereby the closure member may be automatically shifted to one position in response to a controlled pressure and selectively returned to its other position by manual manipulation of the valves controlling the pressure supply and release connections.

2. An arrangement as in claim 1 wherein the fluid to be controlled is the control pressure fluid supplied to the compartments.

3. An arrangement as in claim 1 wherein fluid to be controlled is supplied to the compartments through the pressure supply connections.

HERBERT C. OTIS.

REFERENCES CITED

The following references are of record in the file of this patent:

UNITED STATES PATENTS

| Number | Name | Date |
|---|---|---|
| 901,222 | Anderson | Oct. 13, 1908 |
| 1,167,287 | Ford | Jan. 4, 1916 |
| 2,092,452 | Gilbert | Sept. 17, 1937 |
| 2,251,275 | Ernst | Aug. 5, 1941 |